United States Patent [19]

Lorenz

[11] 4,099,766
[45] Jul. 11, 1978

[54] ROOF CONSTRUCTION

[75] Inventor: Leo J. Lorenz, Farmington, Mich.

[73] Assignee: Massey-Ferguson Inc., Detroit, Mich.

[21] Appl. No.: 817,873

[22] Filed: Jul. 21, 1977

[51] Int. Cl. ................................................ B60j 7/18
[52] U.S. Cl. .................................. 296/137 B; 49/465; 292/246
[58] Field of Search .............. 296/137 B; 49/465, 394; 292/246, 248, 249, 250

[56] References Cited

U.S. PATENT DOCUMENTS

| | | | |
|---|---|---|---|
| 3,913,971 | 10/1975 | Green | 296/137 B |
| 3,955,848 | 5/1976 | Lutz et al. | 296/137 B |
| 3,979,148 | 9/1976 | Martin | 296/137 B |

*Primary Examiner*—Robert R. Song
*Attorney, Agent, or Firm*—John C. Thompson

[57] ABSTRACT

A roof construction for a tractor cab or the like wherein the roof of the cab is provided with an opening normally closed by a removable panel which is secured in place by opposed retaining means in such a manner that the peripheral portion of the removable panel overlies the border about the opening in the roof. The retaining means are of a generally simplified construction and are so designed that when they are in their normal operating position the peripheral portion of the removable panel is held in secure sealing engagement with the border about the opening, the retaining means also being easily moved towards each other to a release position wherein the panel can be readily removed from the opening.

10 Claims, 4 Drawing Figures

ROOF CONSTRUCTION

TECHNICAL FIELD

The present invention relates generally to roof constructions for vehicles and more particularly to a roof construction for a tractor cab or the like wherein the roof is provided with an opening normally closed by a removable panel.

BACKGROUND

It is well known in the prior art to provide roofs with either hinged or removable panels. In order to insure adequate sealing and reliability of the latching mechanisms relatively complex latching means have been employed.

OBJECTS OF SUMMARY OF THE INVENTION

It is an object of this invention to provide a panel for closing an opening in a roof, the panel and the border of the roof about the opening being provided with cooperating retaining means which are of a generally simplified construction, which can be operated expediently, which are generally not subject to failure, and which insure adequate sealing between the peripheral edge portion of the removable panel and the border about the opening.

The above objects and other objects and advantages of this invention are accomplished by providing a primary roof construction having a generally rectangular opening defined by a border, opposed portions of the border being provided with retaining lips which extend downwardly and towards each other, and by providing a removable panel or secondary roof construction which has a peripheral portion adapted to overlie the border about the opening in the primary roof construction, the border and peripheral portion being provided with spaced apart sealing means, and wherein opposed retaining means are carried by the secondary roof construction which normally engage the opposed retaining lips in an overcenter relationship and which can be swung towards each other to a release position to permit the removal of the entire secondary roof construction.

DETAILED DESCRIPTION OF A PREFERRED EMBODIMENT

Figure 1:
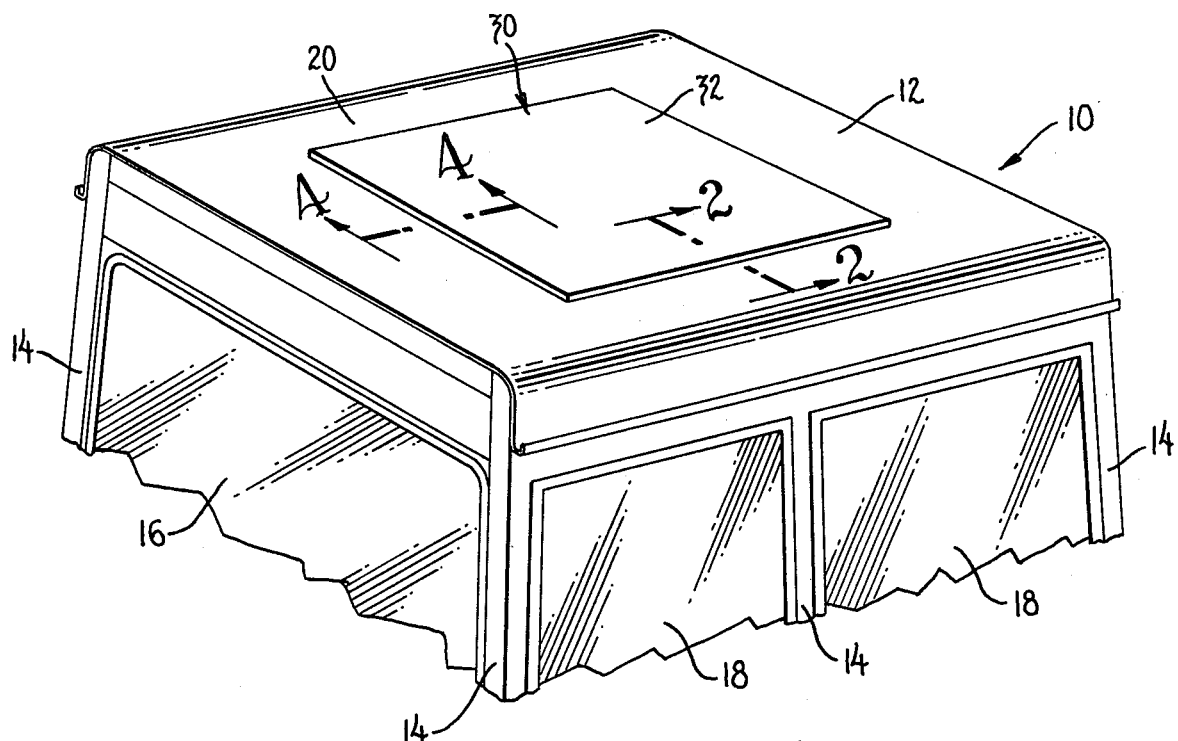
FIG. 1 is a perspective view of the upper portion of a tractor cab in which the principles of the present invention have been incorporated.

Referring first to FIG. 1, a tractor cab is indicated generally at 10, the tractor cab being provided with a primary roof construction 12 supported by various frame members 14. As is conventional, the cab is provided with various windows such as front window 16 and side windows 18.

The primary roof construction 12 is of a double wall construction having spaced apart upper and lower sheet metal members 20,22 (FIG. 2), the manner in which the sheet metal members are spaced apart from each other and are secured to the frame members 14 not being material to the present invention. The primary roof construction is provided with a generally rectangular opening 24 defined by a border portion indicated generally at 26. As can best be appreciated from an inspection of FIGS. 1 and 2 a pair of opposed sides of the border are generally parallel to the sides of the tractor cab. Each of these opposed portions of the border is provided with retaining lips 28 which are secured to the lower sheet metal structure 22, the retaining lips extending downwardly and towards each other.

The removable panel or secondary roof construction is indicated generally at 30 and it is also of a double wall construction having opposed surfaces defined by sheet metal members or the like 32,34 the members 32,34 being held apart by suitable members 36. The secondary roof construction 30 is provided with a peripheral portion indicated generally at 38 which is adapted to overlie the border 26. The peripheral portion 38 and border 26 are provided with spaced apart seals 40,42. When the removable roof is secured to the primary roof 12 the seals extend about the entire circumference of the opening. In the embodiment illustrated the outermost seal 40 is carried by the removable portion of the roof while the innermost seal is secured to the primary roof construction. To this end, the upper sheet metal portion 32 of the secondary roof construction is provided with a flange 44 at its outermost edge to which the seal 40 is secured by an adhesive or the like. Similarly, the sheet metal 20 is provided with an upturned flange 46 at its innermost edge which in turn supports the seal 42. It can thus be seen that if the secondary roof construction is biased downwardly towards the first roof construction that the peripheral portion 38 will be forced into contact with the border 26 and will insure a good seal.

Opposed retaining means indicated generally at 50 are provided on the sides of the secondary roof construction which are parallel to the sides of the tractor cab, there being one retaining means for each of the retaining lips 28. Each of the retaining means includes a pair of spaced apart arms 52 which are interconnected by a bight portion 54 disposed at one end of the arms, the bight portion extending generally perpendicularly to the arms 52 and parallel to the sides of the tractor. Means are provided for mounting one end of the arms 52, the means including a pair of tubes 56 which extend between the sheet metal members 32,34. The upper end of each tube being bifurcated to form therein a slot 58 which lies in a plane generally parallel to the side of the tractor cab and perpendicular to the surface of the roof construction, the bight portion being received within the slot. The other end of the arms 52 are bent inwardly towards each other and support thereon manually engageable means 60 in the form of a roller. When the retaining means are in their normal operative position wherein the peripheral portion is held in sealing contact with the border, the arm will extend downwardly and outwardly. As can be seen from FIGS. 2 and 3 the spaced apart arms 52 are normally disposed to either end of the retaining lip 28. To shift the retaining means to the release position it is only necessary to move the roller inwardly or, as viewed in FIG. 2, to the left.

Figure 2:
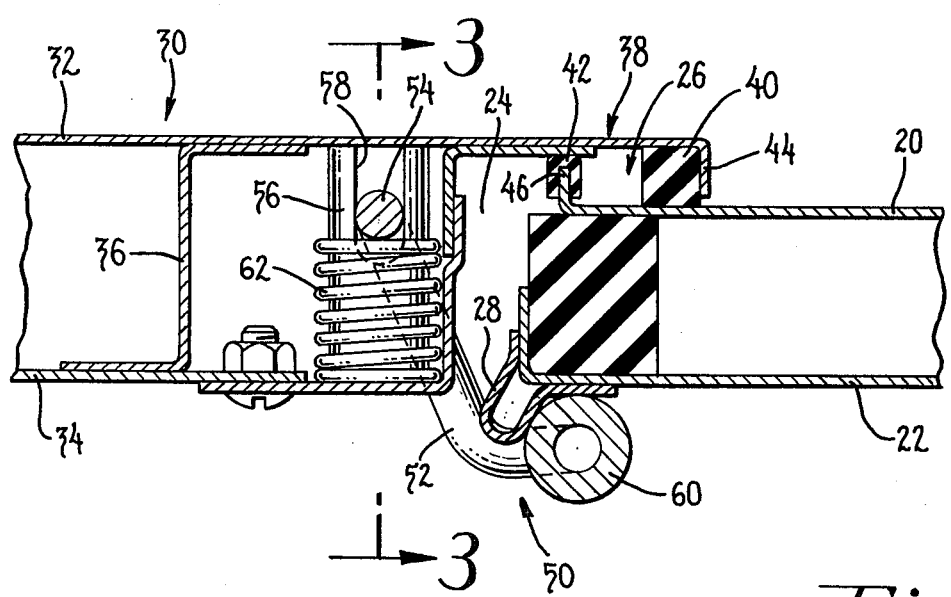
FIG. 2 is a section taken generally along the lines 2—2 in FIG. 1.
Figure 3:
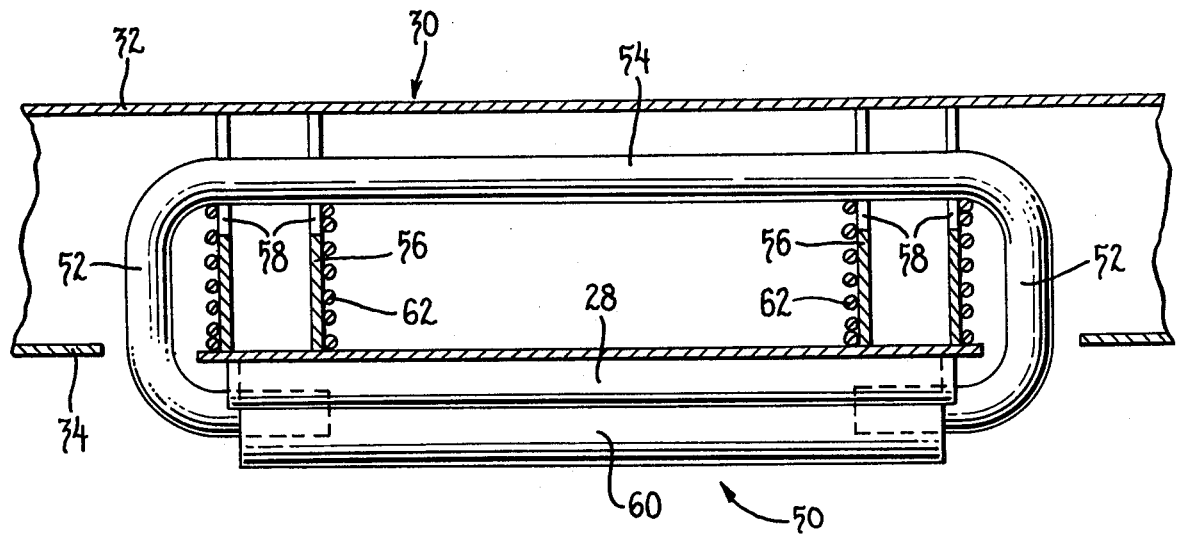
FIG. 3 is a section taken generally along the lines 3—3 in FIG. 2.
Figure 4:
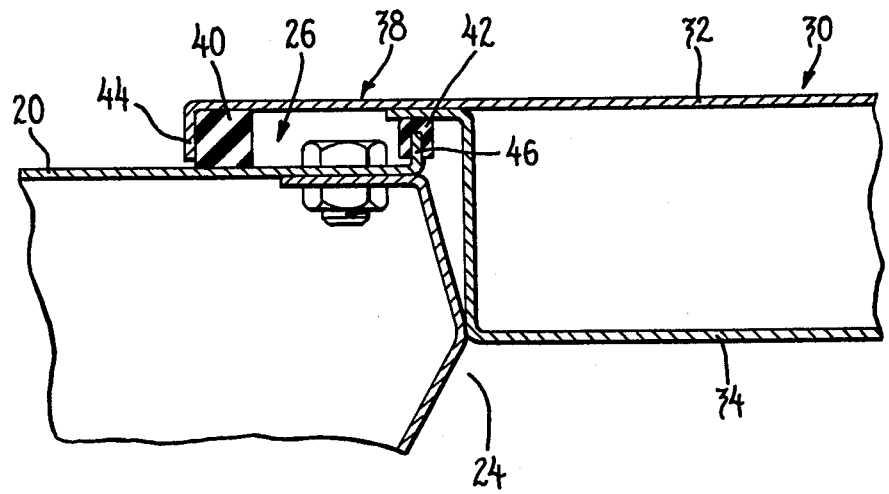
FIG. 4 is a section taken generally along the lines 4—4 in FIG. 1.

The roller is normally maintained in the position illustrated in FIG. 2 by a biasing means in the form of a coil spring 62 which is disposed about the tube 56. The resilient spring will engage the bight portion 54 and bias the bight towards the surface 32 and away from the roller 60. In this position the roller is in an overcenter position. Thus, as the roller moves inwardly from the position shown in FIG. 2 it will be necessary for the spring 62 to be compressed as a roller moves downwardly and inwardly along the retaining lip 28. Thus, the spring will normally maintain the roller in its engaged position.

It should be appreciated that as the tractor operator normally faces forwardly he can reach up with both hands, one hand engaging the left roller and the other hand engaging the right roller, and quickly release the removable secondary roof construction.

I claim:

1. A roof construction for a tractor cab or the like characterized by:
   a primary roof construction provided with a generally rectangular opening defined by a border, opposed portions of the border being provided with retaining lips which extend downwardly and towards each other; and
   a secondary roof construction having a peripheral portion adapted to overlie said border, said secondary roof construction being provided with opposed spaced apart retaining means which normally engage said opposed retaining lips to hold the peripheral portion in sealing engagement with the border, the opposed retaining means being swingable towards and away from each other, each of said opposed retaining means including an arm swingable between a downwardly and outwardly extending normal retaining position and a release position, means mounting one end of the arm on the secondary roof construction to facilitate its movement between retaining and release positions, and manually engageable means carried by the other end of the arm and normally in engagement with an associated retaining lip in an overcenter relationship when the retaining means are in their normal engaging position.

2. The roof construction set forth in claim 1 wherein each of the opposed retaining means includes a pair of parallel arms interconnected by a bight portion at one end, said bight portion being received by the mounting means.

3. The roof construction set forth in claim 1 wherein each of the opposed retaining means is further characterized by the provision of resilient means operable to normally bias the manually engageable means in a direction towards the mounting means when the manually engageable means is in contact with the associated retaining lip in its overcenter position.

4. The roof construction set forth in claim 1 wherein said one end of each of the arms includes a portion generally perpendicular to the arm, and the means mounting said one end of the arm includes a bifurcated portion having an elongated slot extending in a direction generally perpendicular to a surface of the roof construction, said slot receiving the perpendicular end portion of the arm.

5. The roof construction set forth in claim 4 wherein each of the opposed retaining means is further characterized by the provision of resilient means operable to engage the perpendicular end portion of the arm, said resilient means normally biasing said end portion towards said surface of the roof construction and away from the manually engageable means.

6. The roof construction set forth in claim 5 wherein the resilient means is a coil spring disposed about the bifurcated portion.

7. The roof construction set forth in claim 1 wherein each of the opposed retaining means includes a pair of spaced apart arms interconnected at one end by a bight portion received within said mounting means, the bight portion being generally perpendicular to the arms, and wherein the mounting means includes a pair of spaced apart tubes and associated spring means, each of the tubes being provided with a slot which receives a segment of the bight portion, each of the slots being elongated so that the associated bight portion can move towards and away from the associated retaining lip, the spring means being operable to normally bias the bight portion away from the retaining lip.

8. The roof construction set forth in claim 7 wherein the pair of arms for each of the retaining means pass along one end of the associated retaining lip.

9. The roof construction set forth in claim 1 in which the border and peripheral portion are provided with spaced apart sealing means.

10. The roof construction set forth in claim 1 wherein said opposed portions of the border are parallel to the sides of the tractor cab or the like, the secondary roof construction being provided with a pair of retaining means, one disposed on each side of the secondary roof construction in such a manner that the operator of the tractor or the like can simultaneously engage the opposed spaced apart retaining means, one with each of his hands.

* * * * *